US009292257B2

(12) United States Patent
Williams et al.

(10) Patent No.: US 9,292,257 B2
(45) Date of Patent: Mar. 22, 2016

(54) ACCURATE RANGE CALCULATION FOR VEHICLES, COMPUTED OUTSIDE OF THE VEHICLE

(75) Inventors: Aaron Williams, San Jose, CA (US); Mary Long, Mountain View, CA (US); Henrik Paesler, Sunnyvale, CA (US); Binh Tran, San Jose, CA (US); Jens Lehmann, Sunnyvale, CA (US); Kim Srea Phorn, San Jose, CA (US); Natalia Shmoilova, Mountain View, CA (US); Geoff Ryder, Menlo Park, CA (US); Vivek Balasubramanian, Mountain View, CA (US)

(73) Assignee: SAP SE, Walldorf (DE)

( * ) Notice: Subject to any disclaimer, the term of this patent is extended or adjusted under 35 U.S.C. 154(b) by 160 days.

(21) Appl. No.: 13/612,373

(22) Filed: Sep. 12, 2012

(65) Prior Publication Data

US 2014/0074390 A1   Mar. 13, 2014

(51) Int. Cl.
*G06F 7/00* (2006.01)
*G01F 9/00* (2006.01)
*G07C 5/00* (2006.01)
*G01F 9/02* (2006.01)

(52) U.S. Cl.
CPC .. *G06F 7/00* (2013.01); *G01F 9/00* (2013.01); *G01F 9/001* (2013.01); *G01F 9/023* (2013.01); *G07C 5/008* (2013.01)

(58) Field of Classification Search
CPC ........... G06F 7/00; G01F 9/001; G01F 9/023; G01F 9/00; G07C 5/008
USPC ......................................................... 701/123
See application file for complete search history.

(56) References Cited

U.S. PATENT DOCUMENTS

| 8,818,725 B2* | 8/2014 | Ricci | 701/519 |
|---|---|---|---|
| 2006/0212194 A1* | 9/2006 | Breed | 701/29 |
| 2007/0271014 A1* | 11/2007 | Breed | 701/29 |
| 2008/0147265 A1* | 6/2008 | Breed | 701/30 |
| 2008/0147271 A1* | 6/2008 | Breed | 701/36 |
| 2008/0161989 A1* | 7/2008 | Breed | 701/29 |
| 2010/0049397 A1* | 2/2010 | Liu et al. | 701/33 |
| 2011/0082621 A1* | 4/2011 | Berkobin et al. | 701/33 |
| 2011/0184784 A1* | 7/2011 | Rudow et al. | 705/7.38 |
| 2013/0179061 A1* | 7/2013 | Gadh et al. | 701/123 |
| 2014/0172285 A1* | 6/2014 | Kuhn et al. | 701/123 |

* cited by examiner

*Primary Examiner* — Muhammad Shafi
*Assistant Examiner* — Majdi Alsomiri
(74) *Attorney, Agent, or Firm* — Schwegman Lundberg & Woessner, P.A.

(57) ABSTRACT

Example systems and methods for estimating range for a vehicle are provided. In an example, a server remotely located from a vehicle receives vehicle status information from the vehicle as well as reference data from sources other than the vehicle. An estimated range for the vehicle is computed based on both the vehicle status information and the reference data, and then this estimated range is transmitted to the vehicle.

20 Claims, 7 Drawing Sheets

ACCURATE RANGE CALCULATION FOR VEHICLES, COMPUTED OUTSIDE OF THE VEHICLE

TECHNICAL FIELD

This document generally relates to systems and methods for use with vehicles. More specifically, this document relates methods and systems for accurate range calculation for vehicles, computed remotely from the vehicle.

BACKGROUND

Many types of vehicles attempt to provide an estimated range of travel available before the next fuel stop or recharge. Estimated ranges in a vehicle are typically computed based on current driving style and road conditions. For example, if the system detects that a driver is accelerating quickly going uphill, the estimated range will fall because that type of driving is less efficient than driving steadily going downhill. Variations in driving styles at various places along a route, however, may cause the estimated range to fluctuate wildly.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1A:
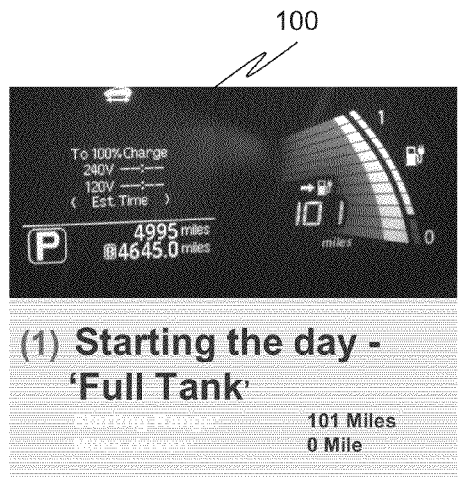
FIG. 1A-C is a diagram illustrating example screen displays depicting a range estimation provided by an electric car.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Many vehicles are now connected to the Internet or other network via wireless communication links. For example, electric vehicles contain a SIM card and are able to send information to a central server via a cell or mobile telephone network. In an example embodiment, this connectivity is leveraged to help improve range estimation in the vehicle. In an example embodiment, the vehicle can send information about its current status to a central server via a wireless network. This central server can then compute the estimated range for the vehicle and send the estimated range back to the vehicle for display to the driver.

It should be noted that while this document will discuss cars specifically as an example of a vehicle that can utilize various described example embodiments, the claims methods, systems and apparatuses described herein should not be interpreted as being limited to cars. Indeed, the example embodiments should not even be limited to vehicles, unless expressly stated. Rather, various embodiments may be used on any device that would have a potential range of travel based on some limiting factor (e.g., fuel, power, etc.), While vehicle examples (cars, trucks, motorcycles, bicycles, boats, airplanes, helicopters, spacecraft, etc.) may be discussed in this document, there is nothing preventing embodiments from being extended to non-vehicles. In one example, an embodiment may be extended to human beings (for example, a hiker wanting to know the maximum distance he or she will be able to travel).

Offloading the computing of the estimated range to a server remote from the vehicle allows for several advantageous elements. While many vehicles contain computers capable of performing estimated range calculations, typically the processors in those computers are not capable of sophisticated calculations using more than a few variables (or, at least, they are relatively slow to perform such calculations, which can be virtually useless if the driver desires a real-time calculation of estimated range to use in deciding whether to make a stop with the vehicle or not). Thus, offloading the computing of the estimated range to the server remote from the vehicle may allow for the computation to be based on more factors than would ordinarily be feasible. For example, the remote system could base the calculation on any status information the vehicle could provide, such as state of charge, elevation, location, speed, air conditioning or heat usage, economy mode status, and/or accessories being used or plugged in (such as the car stereo or a connected phone).

Furthermore, by using a central server instead of a device or electronics mounted in the vehicle to compute the estimated range, many different types of information not previously available to the vehicle can be included in the computation. For example, information from external data sources such as map information, current traffic or road conditions, weather conditions, terrain, and the like can be gathered from external sources and utilized to improve the accuracy of the range calculation. A current route for the vehicle can be referenced, either directly via the user specifying a destination from an in vehicle navigation system, or indirectly by predicting a current route from past history of a driver. For example, many drivers drive the same or similar routes daily (for example, commuting to work). In an example embodiment, the system may determine that the driver is currently driving to work (or to his or her home) from the current driving pattern and the vehicle's location.

Additionally, information from other drivers can be used to enhance the accuracy of the range calculation by the remote server system. In an example embodiment, models are created for driving patterns, based not only on the driver's own driving history but also based on the driving history of other drivers. For example, if a driver programs a new destination into his Global Positioning Satellite receiver to which he has never traveled before (or has traveled to infrequently so the drivers associated historical data set is small), the system can utilize the fact that other drivers have driven this route and use information from their historical information, such as power or fuel used in relation to factors such as expected traffic, location along the route, weather patterns, and the like to improve the accuracy of the range calculation. As such, the driver can leverage the power of information sourced from other drivers in order to obtain an improved range calculation. These models are known as driver models.

Figure 1B:
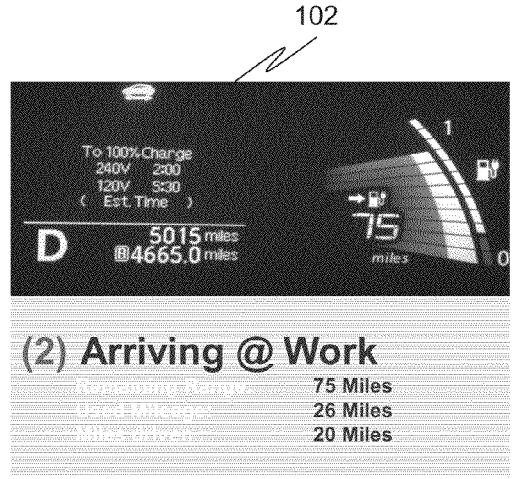
Figure 1C:
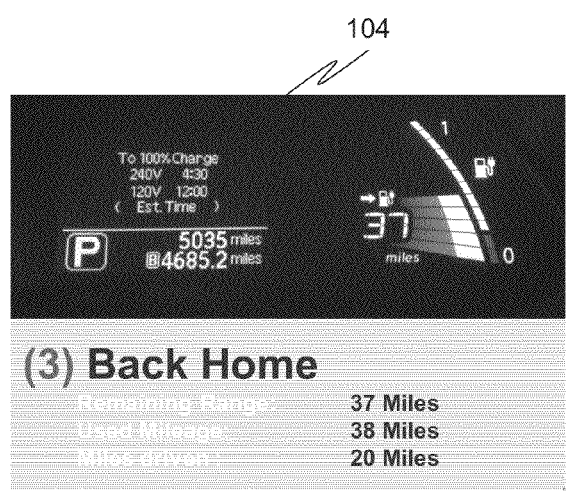

FIG. 1A-C is a diagram illustrating example screen displays depicting a range estimation provided by an electric car. As can be seen from the screen display 100 in FIG. 1A, when the driver begins the day (e.g., leaving for work from home, where the car has been recharging), the estimated total range is shown by way of example to be 101 miles. Referring to the screen display 102 in FIG. 1B, when the driver arrives at work, the remaining range is shown to be estimated at 75 miles, after having driven 20 miles (and used up 26 "miles" worth of charge). In the example screen display 104 in FIG. 1C, when the driver subsequently arrives back at home, the remaining range is estimated to be 37 miles, again after driving 70 miles (and using up 38 "miles" worth of charge on the return trip). Thus, in total, the driver has driven 40 miles, and yet has only 37 miles left of estimated range, despite starting the day with 101 miles of range. If the estimates were accurate, the drive should have had 61 miles left of range, instead of the 37 miles. This makes the driver quite nervous about such estimations, and distrustful that they can be believed. In example embodiments, this range estimation is improved via remote calculations. This process is described herein.

Figure 2:
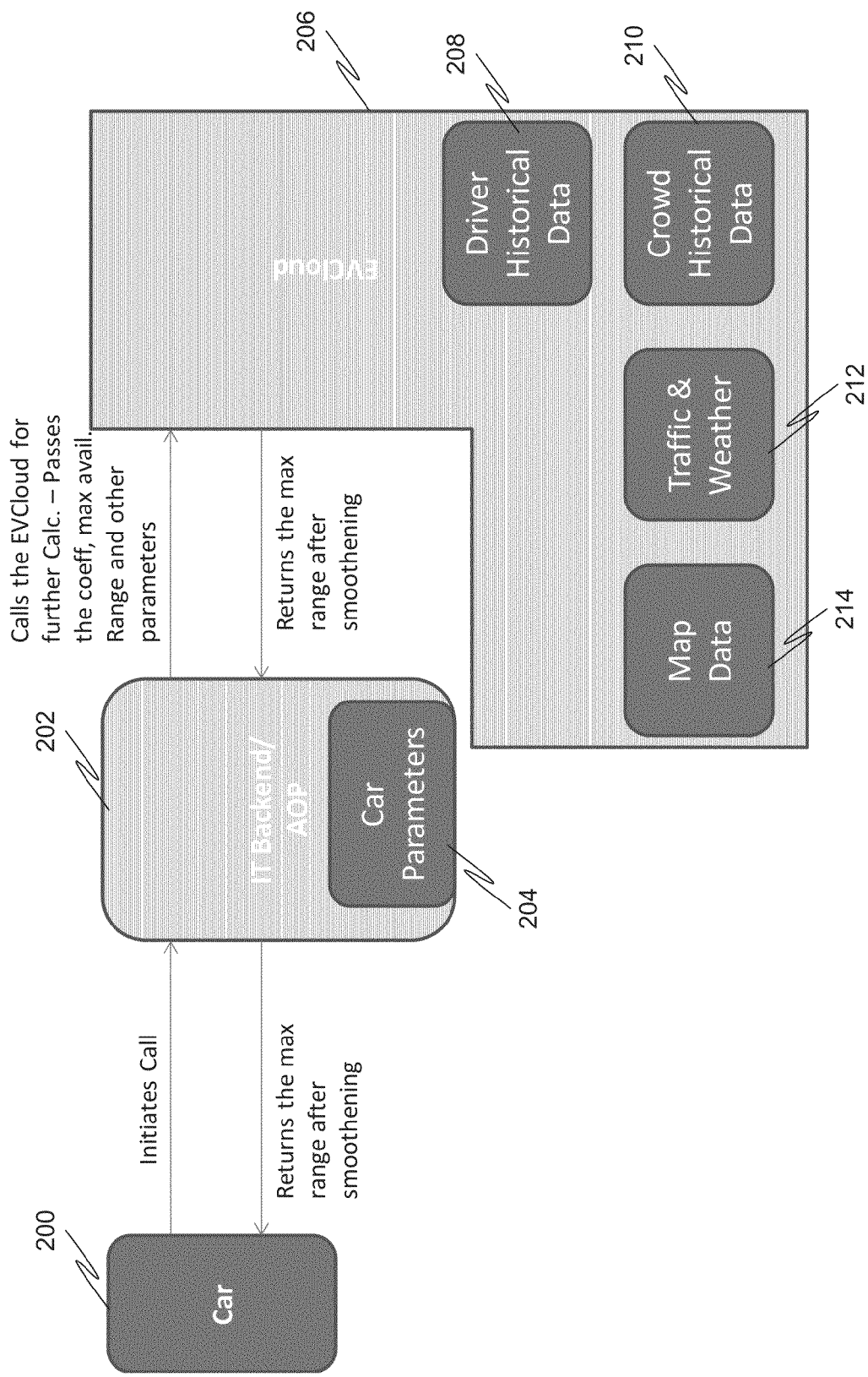
FIG. 2 is a diagram illustrating a system, in accordance with an example embodiment, to provide an estimated operating range for a vehicle.

FIG. 2 is a diagram illustrating a system, in accordance with an example embodiment, to provide an estimated operating range for a vehicle. In the example system, a vehicle 200 initiates a communication (e.g., via a mobile telephone network) to a backend 202 (e.g., comprising one or more server systems, one example being an Information Technology (IT) backend). This backend 202 may contain car parameters 204 (for example, information about the make and model of various vehicles, including the particular car for which the estimated range is being computed). The information may be either general or specific. General information may include, but is not limited to, the name of the manufacturer, the model name and year of the vehicle. Other information may include total battery size, tire width, performance capabilities (e.g., cornering, acceleration, etc.), vehicle weight, and so forth. The communication made to the backend 202 may include real-time information about the vehicle 200 itself, although in some example embodiments this real-time information is always or nearly always being gathered by the backend 202. IN other words, while in one example vehicles status information may be passed at the same time the request for an estimated range is made, in one example embodiments the backend may already know the vehicle status information through periodic monitoring. The real-time information may include, for example, vehicle location, speed, compass direction, incline, acceleration, and the like.

The backend 202 may then communicate vehicle data to an estimation processing system (e.g., an Electric Vehicle (EV) Cloud 206) which may then perform further calculations to determine a estimated range of the vehicle 200. The information available to the backend 202, which includes the car parameters 204 as well as the information transmitted from the vehicle 201, can be sent to the EV cloud 206 during this communication. In some embodiments, not all of the real-time information from the vehicle 200 is communicated to the example EV cloud 206. There may, for example, be privacy concerns with sharing certain information with the EV cloud 206. In an example embodiment, the car manufacturer operates the backend, whereas the EV Cloud 206 is a third-party entity. The more information that is communicated to the EV Cloud 206, of course, the more accurately the EV Cloud 206 can be in calculating estimated maximum ranges. Nevertheless, a balance can be struck between efficiency and privacy. In some example embodiments, the backend 202 may supplement the calculations of the EV Cloud 206 with its own calculations. Accord in an example embodiment, calculation of the estimate range of the vehicle may be performed in a distributed computing manner.

The EV Cloud 206 can then combine this information with other information at its disposal in an algorithm designed to calculate the true maximum range. This process may be referred to as "smoothening" the maximum range. This is because a maximum range may be calculated by the vehicle 200 and/or backend 202, but as described previously, this maximum range may vary wildly.

The information that the EV Cloud 206 then uses in the calculation, in addition to the information passed to it from the vehicle 200 and/or backend 202, may include driver historical data 208, crowd historical data 210, traffic and weather 212, and map information 214. Of course, other types of information are possible as well, and nothing in this document shall be read as limiting the scope of coverage to these particular pieces of information.

Figure 3:
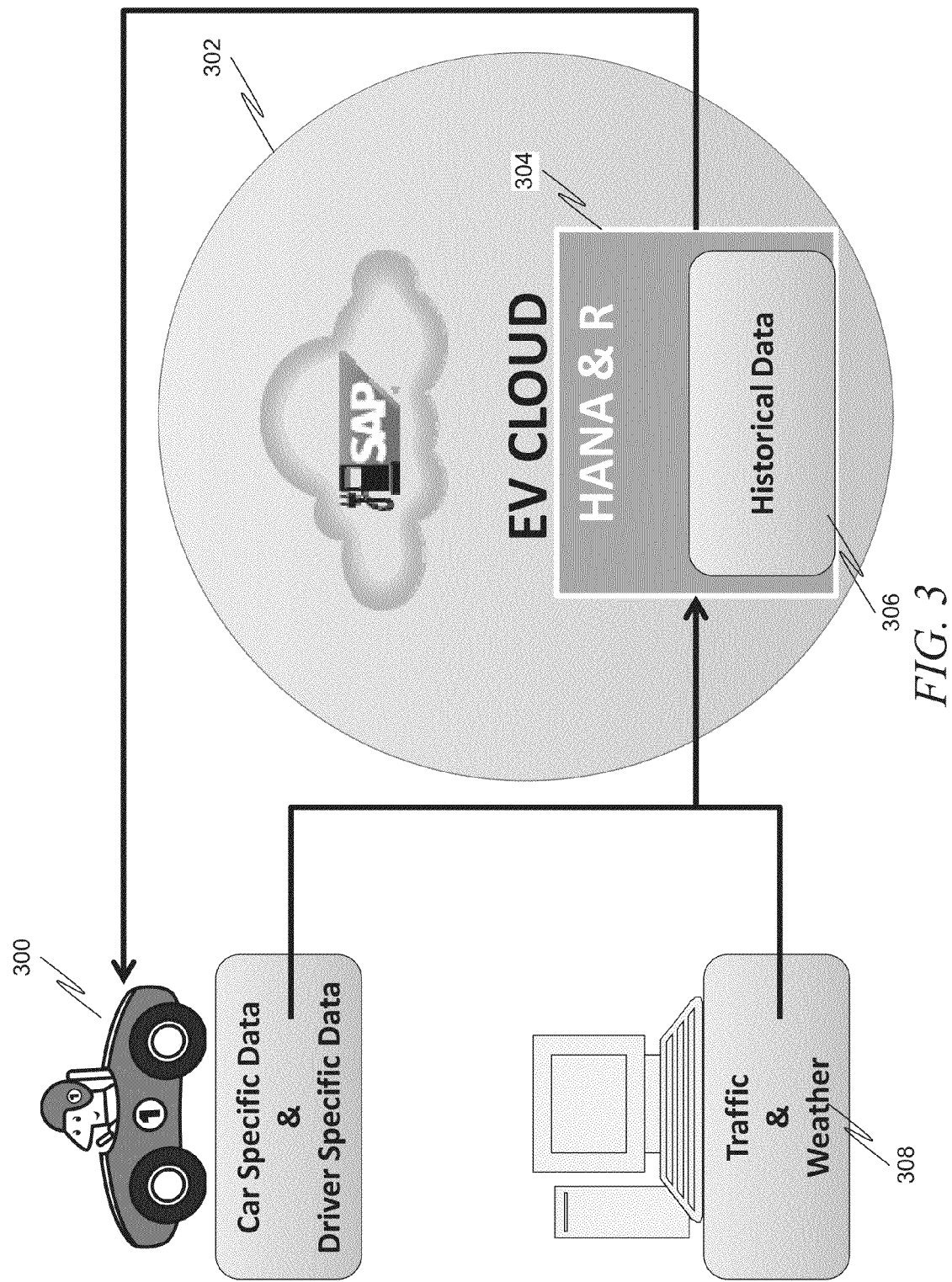
FIG. 3 is a diagram illustrating a system, in accordance with another example embodiment, to provide an estimated operating range for a vehicle.

FIG. 3 is a diagram illustrating a system, in accordance with another example embodiment, to provide an estimated operating range for a vehicle. Here, there is no backend, and the car 300 transmits car specific data and driver specific data directly to an EV cloud 302. The EV cloud 302 may contain a server 304 that can analyze the car specific data and driver specific data along with historical data 306 and traffic and weather information 308, and transmit an estimated range back to the car 300.

The range estimating algorithm utilized by the cloud (or, in some embodiments, the server within the cloud) may vary based on implementation and also based on the type of informal on available. Generally, five "buckets" of data are contemplated. These are:
  (1) "Static" data, such as geographical map data
  (2) Vehicle data, such as data transmitted from the vehicle at some point in time, including speed, location, vehicle settings, and the like
  (3) Crowd-sourced data—including a statistic model of typical vehicle behavior and driver behavior
  (4) Driver-specific data includes driving style, typical routes, typical vehicle settings, and the like
  (5) Real-time data, including traffic, weather, community events, construction/temporary road closures or detours, police speed traps, accidents, and the like In an example embodiment, each "bucket" of data can be analyzed first using an individual and isolated algorithm. The result of this analysis is a coefficient for each bucket. This coefficient may correspond to a modifier of the vehicle's own range estimation, for example. Each algorithm can be developed independently. The coefficient may then be combined in a larger algorithm that results in a finalized estimated range.

Figure 4:
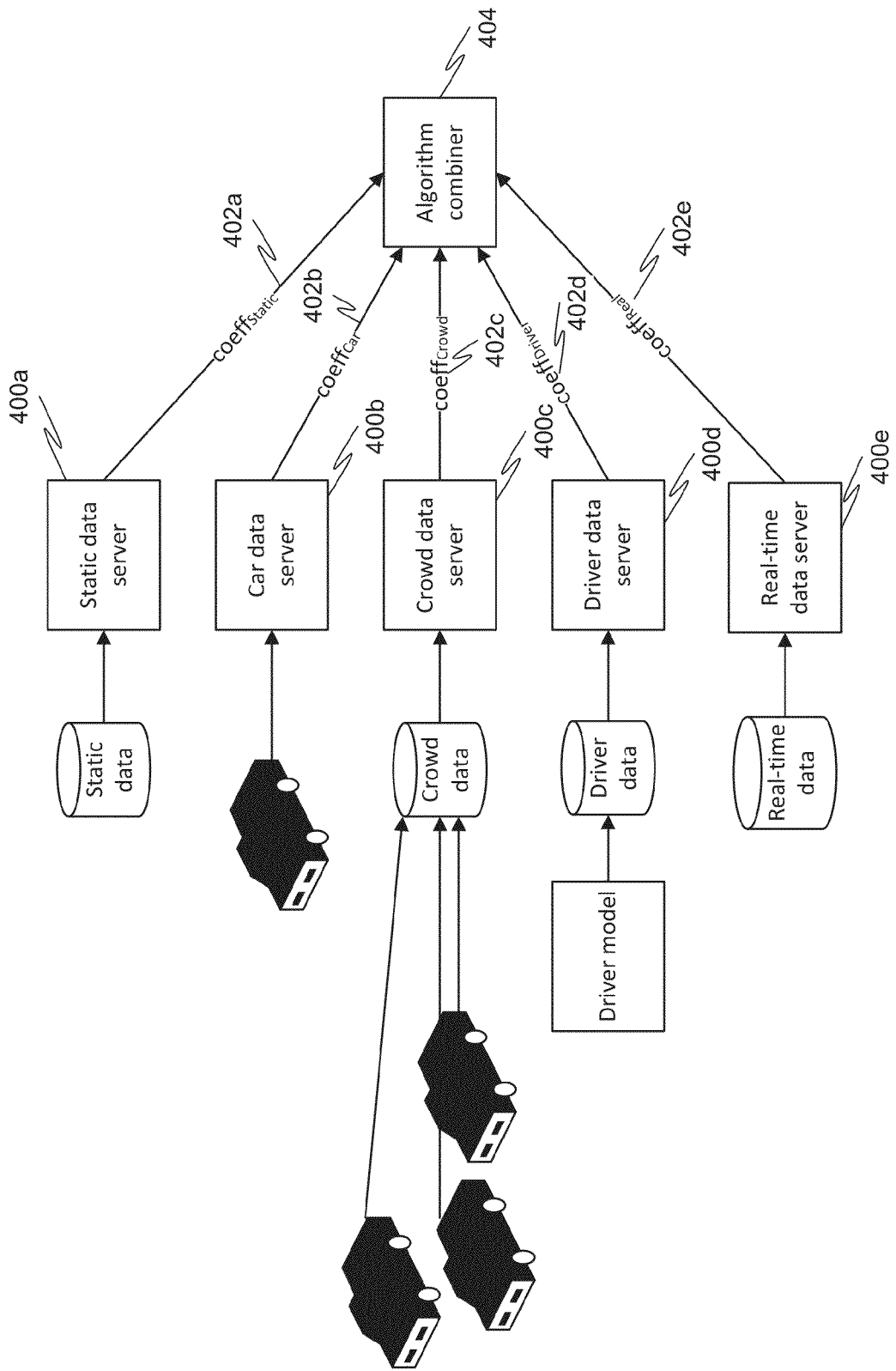
FIG. 4 is an architecture diagram illustrating an example embodiment using several servers to provide an estimated operating range for a vehicle.

In an example embodiment, each of the algorithms corresponding to the various buckets may be run on separate servers. FIG. 4 is an architecture diagram illustrating an example embodiment using several servers to provide an estimated operating range for a vehicle. This allows for each algorithm to be controlled independently. The advantage of controlling each algorithm independently is that each algorithm could potentially be run by a different entity. For example, for privacy concerns, it may be beneficial to have the algorithm on the vehicle data run by a different entity than runs the algorithm on real-time data. There may also be business reasons why one entity would want to operate its own algorithm (for example, if the underlying data is proprietary, and they do not wish to share it with other entities). Additionally, the ordering of each algorithm's execution can be changed if desired, without having any impact on the underlying result.

As can be seen, the outputs of the various servers 400*a*-400*e* include the following:

Static Data coefficient—coeff$_{static}$ 402*a*
Car Data coeff—coeff$_{Car}$ 402*b*
Crowd Data coeff—coeff$_{Crowd}$ 402*c*
Driver Data coeff—coeff$_{Driver}$ 402*d*
Real Time Data coeff—coeff$_{Real}$ 402*e*

In one example embodiment, the following general algorithm can be used to combine all of the coefficients at an algorithm combiner 404:

$$\text{Accurate Range} = \text{Max. Avail Range} + (\text{coeff}_{Static} + \text{coeff}_{Car} + \text{coeff}_{Crowd} + \text{coeff}_{Driver} + \text{coeff}_{Real}) * \text{Max. Avail Range}$$

The coefficients could have a range such as −1 to 1, so that in the formula, the range could reduce or increase depending on the overall sum of the coefficients.

As stated above, another possible embodiment involves providing an estimated range of a human being. This would allow, for example, a hiker to more accurately estimate the distance he or she could travel before growing tired. While such an example does not suffer from the same prior art drawbacks as vehicles in terms of wildly variable range estimations, due mostly to the relative lack of speed variations of hikers, hikers still could benefit from many of the server-based calculations that benefit vehicles. For example, the server may have access to certain weather and terrain information that the user does not. Additionally, the crowd-sourcing aspects would certainly be beneficial, as in unfamiliar terrain it would be beneficial to have a range that is based on other hikers' experiences in the same area. Ordinarily, a hiker may simply look at a map, possibly including terrain data, and make a general estimation based on their own experiences as to hiking different terrain. However, each area is unique, and there may be certain types of terrain variations that cannot be accurately expressed in map form (seasonal streams, sandy soil resulting in slower walking speed, etc.).

In such an embodiment, the user may use an electronic device, such as a mobile phone or tablet computer, to send and receive information to the server, and this electronic device can act in a similar manner to the vehicles described earlier, sending information about the hiker (position, walking speed, etc.) to the server and receiving back an improved range estimate.

It should be noted that while the above descriptions talk about providing a single estimated range (albeit smoothened), other embodiments are foreseen wherein multiple different range calculations are provided. Every range estimation, of course, contains some margin of error. It therefore may be beneficial to present multiple different range calculations having different confidence factors. For example, the system could provide an aggressive range calculation, a moderate range calculation, and a conservative range calculation. The user can then determine on his or her own which range calculation to utilize. If, for example, the user sees that the aggressive range calculation is long enough to reach the destination, but the moderate and conservative range calculations are not, he or she may wish to play it safe and refuel or charge up early in the trip. The user, of course, could elect to be aggressive, however and choose to try and make it to a zone reachable only under an aggressive range calculation.

In an example embodiment, the multiple estimated ranges can be presented in the form of a heat map. A map may be utilized and areas of the map may be shaded to depict the confidence levels of reaching those corresponding areas. Of course, this requires additional calculations as the system will not just be looking to calculate an estimated range for one particular route, but rather estimated ranges for all possible routes from a current destination. Nevertheless, such a depiction may be quite helpful to the user in determining when and where to refuel or charge up.

Figure 5:
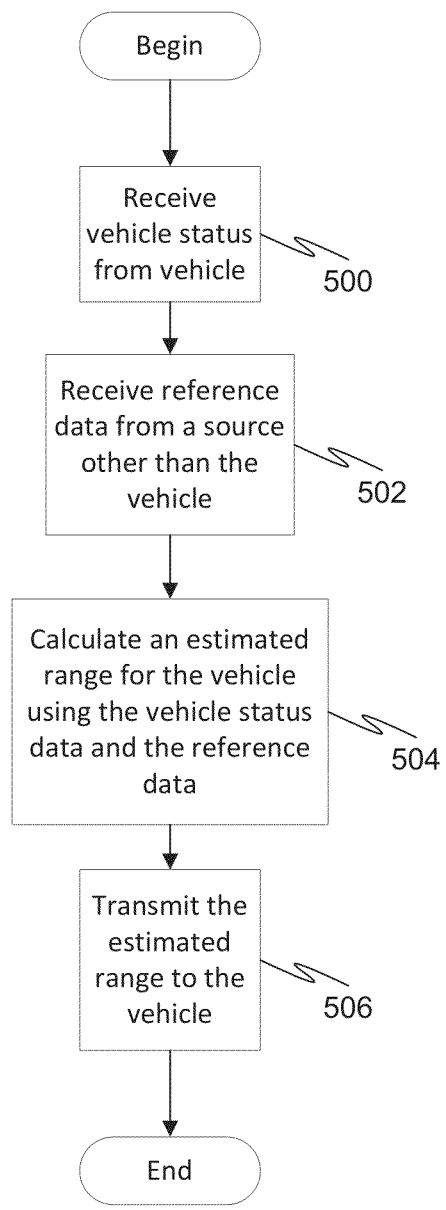
FIG. 5 is a flow diagram illustrating a method, in accordance with an example embodiment, for providing an estimated operating range for a vehicle.

FIG. 5 is a flow diagram illustrating a method, in accordance with an example embodiment, for providing an estimated operating range for a vehicle. This method may be performed by a server separate and distinct from the vehicle. At 500, vehicle status data is received from a vehicle. At 502, reference data is received from a source other than the vehicle. At 504, an estimated range for the vehicle is calculated using the vehicle status data and the reference data. At 506, the estimated range is transmitted to the vehicle.

Figure 6:
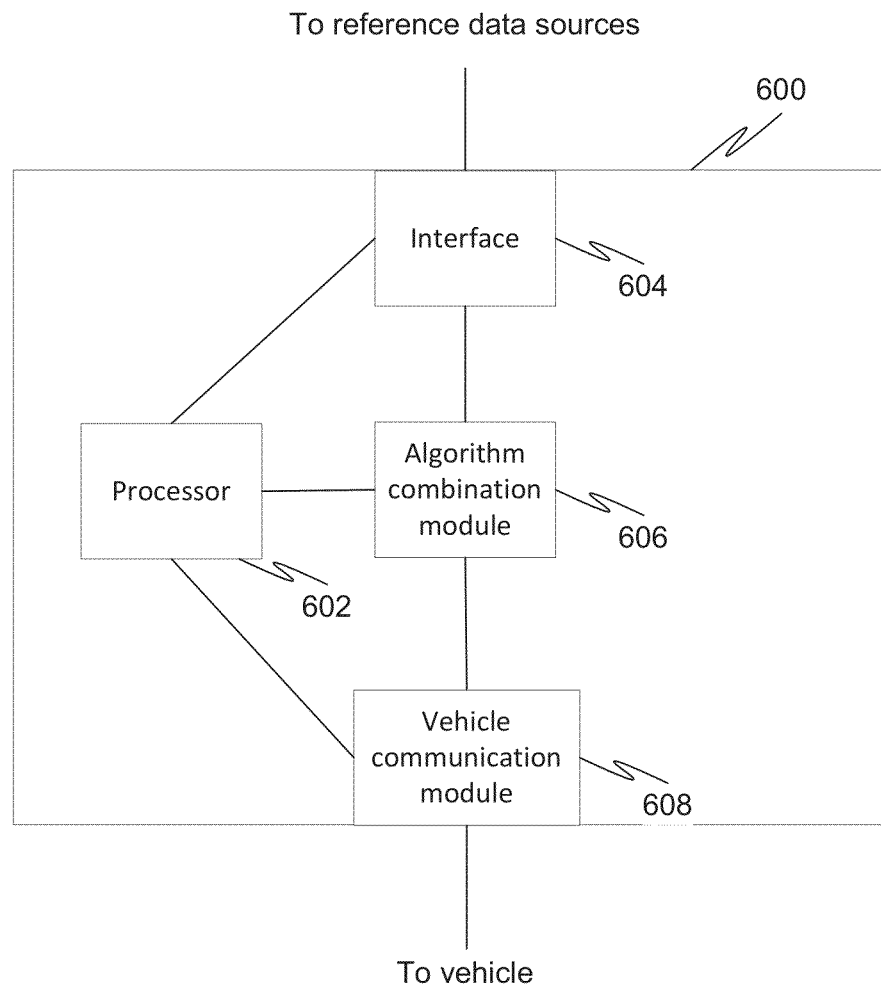
FIG. 6 is a diagram illustrating the components of a server, in accordance with an example embodiment, to provide an estimated operating range for a vehicle.

Certain embodiments are described herein as including logic or a number of components, modules, or mechanisms. FIG. 6 is a diagram illustrating the components of a server, in accordance with an example embodiment, to provide an estimated operating range for a vehicle. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the server 600) or one or more hardware modules of a computer system (e.g., a processor 602 or a group of processors) may be configured by software (e.g., an application or application portion) as a hardware module that operates to perform certain operations as described herein. The modules may include an interface 604 designed to interface with one or more other information sources (not pictured). An algorithm combination module 606 is then designed to compute the estimated range for the vehicle based on some combination of information from the other information sources. These other information sources may simply provide raw information or may perform a estimated range calculation themselves and provide that estimated range. A vehicle communication module 608 then is designed to communicate the range estimated by the algorithm communication module to the vehicle.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 602 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware, modules include a general-purpose processor 602 that is configured using software, the general-purpose processor 602 may be configured as respective different hardware modules at different times. Software may accordingly configure a processor 602, for example, to constitute a particular hardware module at one instance of time and to constitute a different hardware module at a different instance of time.

Modules can provide info oration to, and receive information from, other modules. For example, the described modules may be regarded as being communicatively coupled. Where multiples of such hardware modules exist contemporaneously, communications may be achieved through signal transmissions (such as, for example, over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time access the memory device to retrieve and process the stored output. Modules may also initiate communications with input or output devices, and can operate on a resource (for example, a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 602 or processor-implemented modules. The performance of certain of the operations may be distributed among the one or more processors 602, not only residing within a single machine but deployed across a number of machines. In some example embodiments, the processors 602 may be located in a single location (e.g., within a home environment, within an office environment, or as a server farm), while in other embodiments, the processors 602 may be distributed across a number of locations.

Figure 7:
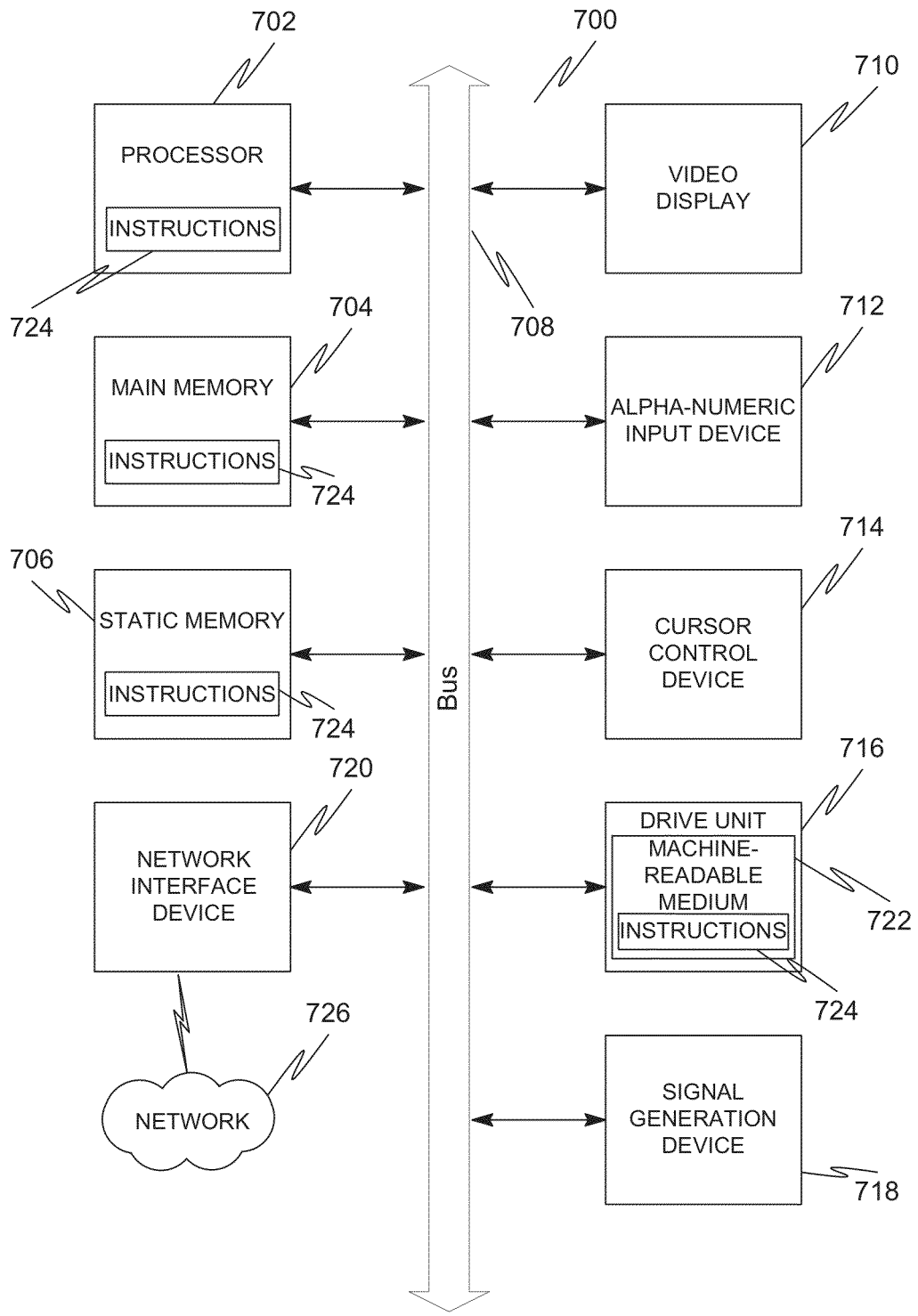
FIG. 7 is a block diagram of a computer processing system at a server system, within which a set of instructions, for causing the computer to perform any one or more of the methodologies discussed herein, may be executed.

FIG. 7 is a block diagram of a computer processing system at a server system, within which a set of instructions, for causing the computer to perform any one or more of the methodologies discussed herein, may be executed.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 700 includes processor 702 (e.g., a central processing unit (CPU), a graphics processing unit (GPU) or both), main memory 704 and static memory 706, which communicate with each other via bus 708. The processing system 700 may further include video display unit 710 (e.g., a plasma display, a liquid crystal display (LCD) or a cathode ray tube (CRT)). The processing system 700 also includes alphanumeric input device 712 (e.g., a keyboard), a user interface (UI) navigation device 714 (e.g., a mouse, touch screen, or the like), a disk drive unit 716, a signal generation device 718 (e.g., a speaker), and a network interface device 720.

The disk drive unit 716 includes computer-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the processing system 700, the main memory 704 and the processor 702 also constituting computer-readable, tangible media.

The software 724 may further be transmitted or received over network 726 via a network interface device 720 utilizing, any one of a number of well-known transfer protocols (e.g., HTTP).

While the computer-readable medium 722 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While various implementations and exploitations are described, it will be understood that these embodiments are illustrative and that the scope of the claims is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims.

It should be noted that while this document discusses cars specifically as an example of a vehicle that can utilize various embodiments, the scope of the claims should not be interpreted to be limited to cars. Indeed any vehicle could benefit from various aspects of the embodiments described. This may include, but is not limited to, cars, trucks, motorcycles, bicycles, boats, airplanes, helicopters, spacecraft, and so forth. An additional advantage is recognized when the purchase is related to the vehicle itself, as the anti-fraud aspects are more prevalent. For example, while technically someone could utilize someone else's car to purchase an item that is only for their own benefit (such as a teenager borrowing a parent's car to purchase fast food without the parent's permission), if instead the item or service pertains only to the car (such as paying for refueling), it becomes harder to obtain only a personal benefit (i.e., one that benefits only the person separate and apart from the vehicle, such as purchasing food or clothing) for the purchase, and thus makes it less likely for a fraudulent transaction to be attempted.

While the embodiments are described with reference to various implementations and exploitations, it will be understood that these embodiments are illustrative, and that the scope of claims provided below is not limited to the embodiments described herein. In general, the techniques described herein may be implemented with facilities consistent with any hardware system or hardware systems defined herein, Many variations, modifications, additions, and improvements are possible.

The term "computer readable medium" is used generally to refer to media such as main memory, secondary memory, removable storage, hard disks, flash memory, disk drive memory, CD-ROM and other forms of persistent memory. It should be noted that program storage devices, as may be used to describe storage devices containing executable computer code for operating various methods, shall not be construed to cover transitory subject matter, such as carrier waves or signals. Program storage devices and computer readable medium are terms used generally to refer to media such as main memory, secondary memory, removable storage disks, hard disk drives, and other tangible storage devices or components.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method for providing an estimated operating range for a vehicle, the method comprising:
   receiving, at a server remotely located from the vehicle, vehicle status data from the vehicle via a communication network;
   accessing reference data derived from a source other than the vehicle;
   receiving a map information coefficient from output of a first algorithm at a map server;
   receiving a crowd-sourced data coefficient from output of a second algorithm at a crowd data server;
   calculating an estimated range for the vehicle using the vehicle status data and the reference data, the estimated range being a distance available to be traveled by the vehicle before a next fuel stop or recharge is needed;
   wherein the first and second algorithms being controlled independently from one another and the calculating comprises calculating the following formula:

estimated range=maximum available range of vehicle+(map information coefficient+crowd-sourced data coefficient)*maximum available range of vehicle;

and
   sending the estimated range back to the vehicle for display to the driver.

2. The method of claim 1, wherein the reference data includes information from a driver model.

3. The method of claim 1, wherein the reference data includes driver-specific data.

4. The method of claim 1, wherein the reference data includes information about other vehicles and/or drivers.

5. The method of claim 1, wherein the reference data includes map information.

6. The method of claim 1, wherein the reference data includes traffic information.

7. The method of claim 1, wherein the reference data includes weather information.

8. The method of claim 1, further comprising:
   receiving a vehicle data coefficient from output of a third algorithm at a car data server;
   receiving a driver data coefficient from output of a fourth algorithm at a driver data server;
   receiving a real-time data coefficient from output of a fifth algorithm at a real-time data server;
   the first, second, third, fourth, and fifth algorithms being controlled independently from one another;
   the calculating comprising calculating the following formula:

estimated range=maximum available range of vehicle+(map information coefficient+vehicle data coefficient+crowd-sourced data coefficient+ driver data coefficient+real-time data coefficient) *maximum available range of vehicle.

9. The method of claim 8, wherein the reference data includes weather information.

10. A cloud server comprising:
    a processor;
    memory;
    an interface to a plurality of range estimation servers, each of the range estimation servers designed to calculate a range for a vehicle for a particular route based on identical vehicle status information received from a vehicle but different reference data for each range estimation server, wherein the reference data comprises a map information coefficient from output of a first algorithm at a map server and a crowd-sourced data coefficient from output of a second algorithm at a crowd data server, the first and second algorithms being controlled independently from one another;
    an algorithm combination module designed to compute an estimated range for the vehicle based upon a combination of each of the calculated ranges from each of the plurality of range estimation servers, the estimated range being a distance available to be traveled by the vehicle before a next fuel stop or recharge is needed, wherein the computing comprises calculating the following formula:

estimated range=maximum available range of vehicle+(map information coefficient+crowd-sourced data coefficient)*maximum available range of vehicle;

and
- a vehicle communication module designed to transmit the estimated range back to the vehicle for display to the driver.

11. The cloud server of claim 10, wherein at least one of the plurality of range estimation servers bases its calculated range on information received from other vehicles.

12. The cloud server of claim 10, wherein the estimated range is an estimated range of travel before recharging of the vehicle is necessary.

13. The cloud server of claim 10, wherein the estimated range is an estimated range of travel before refueling of the vehicle is necessary.

14. The cloud server of claim 10, wherein the estimated range provided by the algorithm combination module includes a plurality of ranges at different confidence levels.

15. The cloud server of claim 14, wherein the vehicle is designed to display the plurality of ranges as a heat map.

16. A non-transitory computer-readable storage medium comprising instructions that, when executed by at least one processor of a machine, cause the machine to perform operations comprising:
- receiving, at a server remotely located from the vehicle, vehicle status data from the vehicle via a communication network;
- accessing reference data derived from a source other than the vehicle;
- receiving a map information coefficient from output of a first algorithm at a map server;
- receiving a crowd-sourced data coefficient from output of a second algorithm at a crowd data server;
- calculating an estimated range for the vehicle using the vehicle status data and the reference data, the estimated range being a distance available to be traveled by the vehicle before a next fuel stop or recharge is needed;
- wherein the first and second algorithms being controlled independently from one another and the calculating comprises calculating the following formula: estimated range=maximum available range of vehicle+(map information coefficient+crowd-sourced data coefficient)*maximum available range of vehicle; and
- sending the estimated range back to the vehicle for display to the driver.

17. The non-transitory computer-readable storage medium of claim 16, wherein the vehicle status information includes vehicle position.

18. The non-transitory computer-readable storage medium of claim 16, wherein the vehicle status information includes vehicle speed.

19. The non-transitory computer-readable storage medium of claim 16, wherein the vehicle status information includes air conditioning status.

20. The non-transitory computer-readable storage medium of claim 16, wherein the vehicle status information includes tire pressure.

* * * * *